United States Patent
Hamilton, II et al.

(10) Patent No.: US 7,231,443 B2
(45) Date of Patent: **\*Jun. 12, 2007**

(54) SYSTEM ALLOWING USER ASSOCIATING USER OFF-LINE STATUS MESSAGES OF SELECTABLE CONTENT WITH PARTICIPANTS ON USER'S AUTHORIZED ACCESS LISTS

(75) Inventors: Rick Allen Hamilton, II, Charlottesville, VA (US); James Jerome Labus, Charlottesville, VA (US); James Wesley Seaman, Falls Church, VA (US); Timothy Moffett Waters, Richmond, VA (US)

(73) Assignee: International Business Machines Corporation, Armonk, NY (US)

( * ) Notice: Subject to any disclaimer, the term of this patent is extended or adjusted under 35 U.S.C. 154(b) by 862 days.

This patent is subject to a terminal disclaimer.

(21) Appl. No.: 10/411,412

(22) Filed: Apr. 10, 2003

(65) Prior Publication Data

US 2004/0215730 A1 Oct. 28, 2004

(51) Int. Cl.
*G06F 15/173* (2006.01)
(52) U.S. Cl. ..................... 709/224; 709/225
(58) Field of Classification Search ............. 709/224, 709/206, 229, 219, 225, 207; 345/752; 455/414.1; 379/88.17
See application file for complete search history.

(56) References Cited

U.S. PATENT DOCUMENTS

| 6,119,101 | A | 9/2000 | Peckover ..................... 705/26 |
| 6,205,432 | B1 | 3/2001 | Gabbard et al. .............. 705/14 |
| 6,272,532 | B1 * | 8/2001 | Feinleib ...................... 709/206 |
| 6,301,609 | B1 | 10/2001 | Aravamudan et al. ...... 709/207 |
| 6,330,554 | B1 | 12/2001 | Altschuler et al. ........... 706/21 |
| 6,338,044 | B1 | 1/2002 | Cook et al. ................... 705/14 |
| 2002/0010746 | A1 * | 1/2002 | Jilk et al. ..................... 709/206 |
| 2002/0026351 | A1 | 2/2002 | Coleman ...................... 705/14 |
| 2002/0046099 | A1 | 4/2002 | Frengut et al. ................ 705/14 |
| 2002/0048349 | A1 | 4/2002 | Bixler et al. ................ 379/67.1 |
| 2002/0059590 | A1 | 5/2002 | Kitsukawa et al. .......... 725/36 |
| 2002/0198951 | A1 * | 12/2002 | Thurlow et al. ............. 709/206 |
| 2003/0217142 | A1 * | 11/2003 | Bobde et al. ............... 709/224 |
| 2003/0231207 | A1 * | 12/2003 | Huang ........................ 345/752 |
| 2004/0161080 | A1 * | 8/2004 | Digate et al. ............ 379/88.17 |
| 2004/0203659 | A1 * | 10/2004 | Mikan ...................... 455/414.1 |
| 2004/0205161 | A1 * | 10/2004 | Hamilton et al. ........... 709/219 |

\* cited by examiner

*Primary Examiner*—Le Hien Luu
(74) *Attorney, Agent, or Firm*—David A. Mims, Jr.; Robert V. Wilder

(57) ABSTRACT

A method and implementing instant messaging processing system are provided which include means by which a user is enabled to input certain selective details concerning the user's off-line status. Such user selections are stored by an IM server and subsequently made available to other IM users when such other IM users log-on to the IM application. User selections include a listing of common reasons why a user is not available and means are provided for the user to select specific applicable details concerning the user's off-line status. A user is also enabled to input custom text messages to selectively provide even more specific detail to other users of the IM application concerning the user's off-line status. Means are further provided to enable a user to input more than one custom off-line message and also to indicate the timing of each message and when each message shall be made available to other IM users. A user is also enabled to selectively designate certain individuals to whom access to predetermined messages is made available during the off-line status of the IM user such that access to one off-line message is made available to selected IM participants but not to all IM participants.

12 Claims, 9 Drawing Sheets

Ｕ S 7,231,443 B2

SYSTEM ALLOWING USER ASSOCIATING USER OFF-LINE STATUS MESSAGES OF SELECTABLE CONTENT WITH PARTICIPANTS ON USER'S AUTHORIZED ACCESS LISTS

RELATED APPLICATIONS

Subject matter disclosed but not claimed herein is disclosed and claimed in co-pending related applications 10/411,416 and 10/411,468.

FIELD OF THE INVENTION

The present invention relates generally to information processing systems and more particularly to a methodology and implementation for enabling improved processing functionality within instant messaging systems.

BACKGROUND OF THE INVENTION

The existence and continued acceptance and use of the World Wide Web and the Internet have resulted in many new and useful applications becoming available to users of the Internet. One such application which is growing in popularity is known as "instant messaging" or "IM". Various IM applications are provided from many sources but all such applications have many common features.

In general, IM applications enable a user to register with an IM server on the World Wide Web or other network using the Internet. Such applications may also be accessed through other local area and wide area networks as well. When a user accesses an IM application, the user inputs the user's personal information together with a user identification (ID) and a password. The user is then enabled to designate a user name which the user will use to identify himself or herself in subsequent "chat" sessions or in sending messages to and receiving messages from other users.

Instant messaging has become an important part of both personal and business communications. Millions of users communicate using instant messaging systems every day, and as such, functionality and usability enhancements are important to the continued success of this communication tool. Instant messaging applications do, however, have serious flaws and/or shortcomings which must be corrected if they are to continue to thrive as a communications vehicle.

For example, with current applications, when a user exits the program and goes off-line, only a brief reference is available to other on-line participants to indicate the on-line status of the departing user. In many instances, when "buddies" (i.e. individuals identified and designated by a user to be included on the user's "buddy list") of a user log-on to an IM application, they can determine only that the "User is Off-Line", or "Unavailable". These perfunctory announcements are generated by an IM server and are typically automatically provided and accessible to all when a user logs-off from an IM application Thus, there is a need for an improved methodology and system for enabling improved instant message processing in electronic communication systems.

SUMMARY OF THE INVENTION

In accordance with the present invention, there is provided an instant messaging system including means by which a user is enabled to input certain selected details concerning the user's off-line status. Such user selections are stored by an IM server and subsequently made available to other IM users when such other IM users log-on to the IM application. Means are provided to enable a user to input more than one custom off-line message and also to indicate the timing of each message and when each message shall be made available to other IM users.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
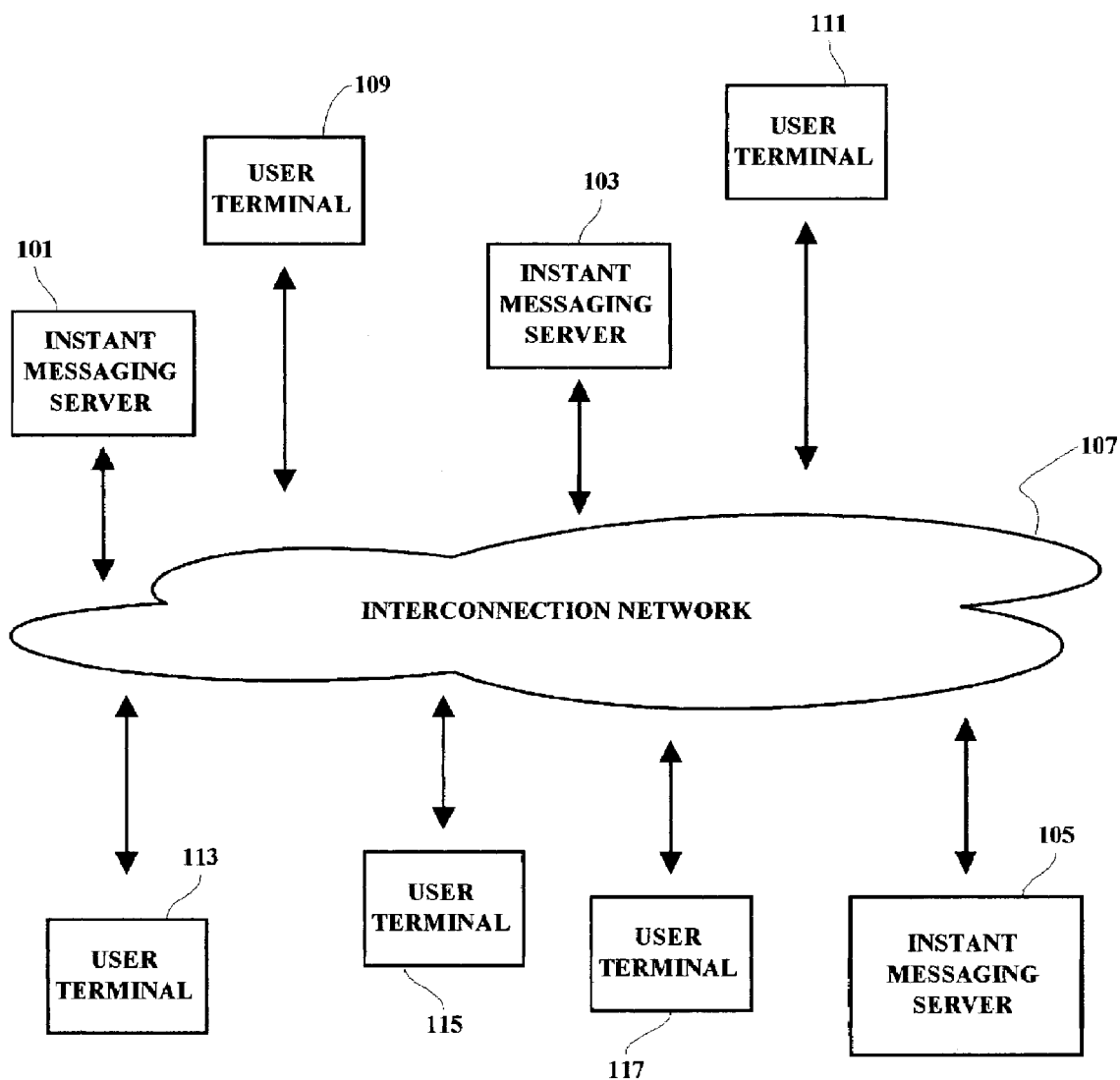
FIG. 1 is a schematic diagram illustrating a system which may be used in an exemplary implementation of the present invention.

It is noted that circuits and devices which are shown in block form in the drawings are generally known to those skilled in the art, and are not specified to any greater extent than that considered necessary as illustrated, for the understanding and appreciation of the underlying concepts of the present invention and in order not to obfuscate or distract from the teachings of the present invention.

The various methods discussed herein may be implemented within any communication device capable of receiving and transmitting signals utilized in instant messaging applications and/or chat sessions, over any inter-connection network, including but not limited to the Internet and the World Wide Web. In the present disclosure such devices include, but are not limited to, cellular and other wireless devices, personal digital assistant devices, laptop and personal computers and also desk top computers connected in local area or wide area networks. The present discussion will be directed to a server-based instant messaging and/or chat application although it is understood that the principles involved in the present invention may be applied, inter alia, to all of the above noted receiving and transmitting devices and systems.

In FIG. 1 there is shown an exemplary system in which the present invention may be implemented. The illustration shows several user terminals 109, 111, 113, 115 and 117 which may be interconnected with several instant messaging servers 101, 103 and 105 through an interconnection network 107 such as the Internet. The servers include instant messaging and chat session applications and the individual users' terminals also include chat session and instant messaging programming to enable the users to "chat" or send instant messages to each other by exchanging communications between servers over the interconnection network 107. As noted above, the user terminals can be a desktop personal computer (PC) or any information processing device, such as a cellular phone or personal digital assistant device, which may be connected as shown in FIG. 1 through a hard-wired or wireless system arrangement.

Figure 2:
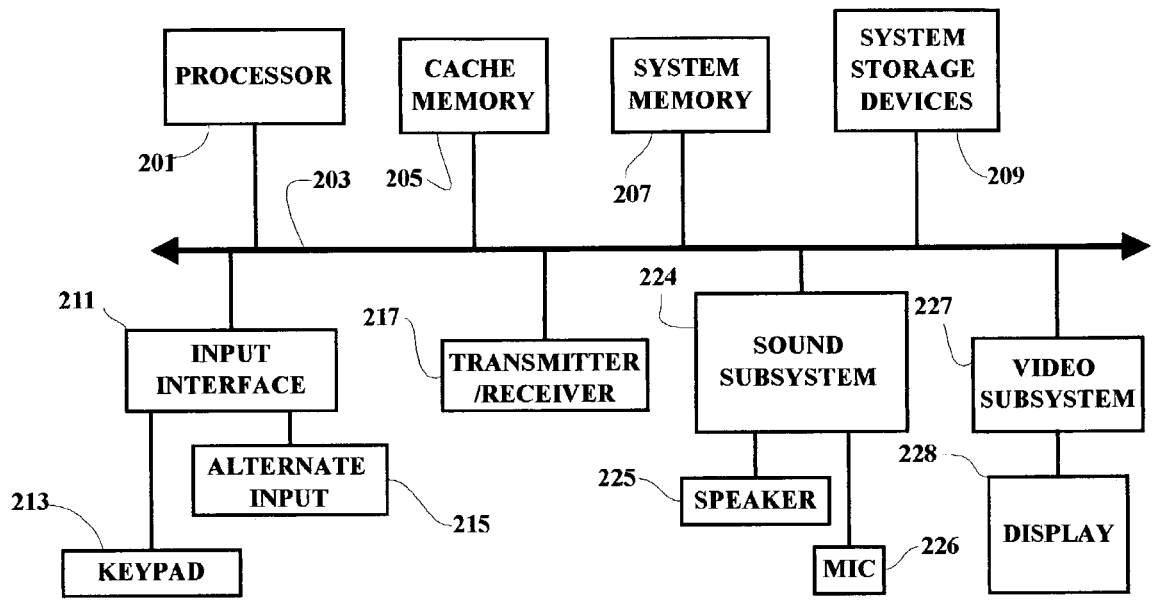
FIG. 2 is a schematic block diagram illustrating several of the major components of an exemplary user terminal connected within an Instant Messaging system.

Several of the major components of the device 101 are illustrated in FIG. 2. A processor circuit 201 is connected to a system bus 203. It is noted that the processing methodology disclosed herein will apply to many different bus and/or network configurations and is not limited to the configuration of the present example. A cache memory device 205 and a system memory unit 207 are also connected to the bus 203. The exemplary system also includes a system storage devices 209. The system bus 203 is also connected through an input interface circuit 211 to a keypad or keyboard 213 as well as alternate input devices 215 which may include voice and/or stylus input devices. The bus 203 is also coupled to a transmitter/receiver section 217 which enables the receipt and transmission of digital information. The illustrated system may also be coupled to a network system through the transmitter/receiver section 217. The exemplary system also includes a sound subsystem 224. Input means such as a microphone 226 and output means such as speaker 225 may also be included to enable a user to communicate with the device using voice commands and voiced menu and message playbacks. A video subsystem 227, which may include a graphics subsystem, is connected between the bus 203 and a display device 228.

Typically in an instant messaging session, a user logs on to the system and selects an instant messaging application. A so-called "buddy list" is created by a user and comprises a list of IM users which a single user may identify as his or her "buddies". In the instant messaging application, when a user logs-on to the system, the user is then immediately notified as to which of the individuals on the user's buddy list are currently logged-on to the application and able to receive instant messages.

As hereinbefore noted, when the user logs-off the application, typically the IM server automatically generates a "not available" or similar message which will appear to all participants who are logged-on or who thereafter log-on and who have the user on their respective buddy list.

Figure 3:
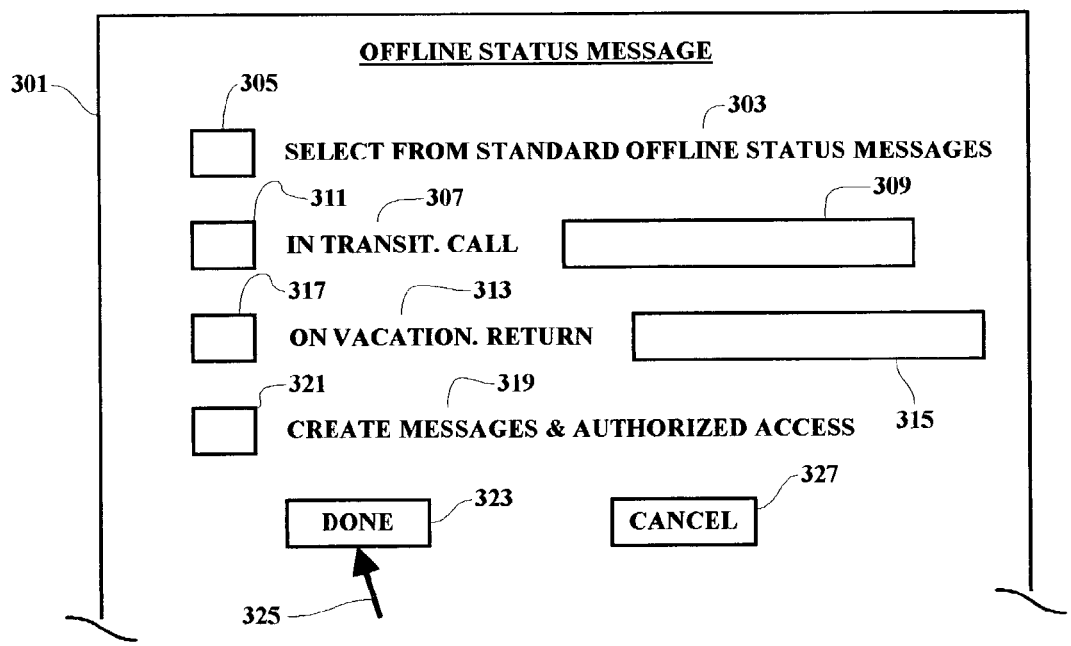
FIG. 3 is an illustration of a display screen which may be used to enable user selection of several user preferences in an exemplary embodiment of the present invention.

In the present example, as shown in FIG. 3, when a user logs-off the IM application, an Off-Line Status Message screen 301 is displayed to the user and the user is enabled to make selections from the screen using a pointing device 325 regarding the off-line status of the user. The user's selections are then stored at the IM server and made available in accordance with the user's selections to other IM users. The exemplary display screen 301 enables a user to select a standard message from a listing of selectable off-line status messages 303. If the user wishes to select from a listing of standard off-line messages, the user is enable to place a marker such as a "X" in the appropriate box 305 using the pointer 325 and keyboard 213 and then pointing to the "DONE" box 323. The selection process may also be accomplished using other techniques such as hypertext selections where the user need only point and click on the hypertext selection 303 and a screen or pop-up window (not shown) containing possible standard message selections would be displayed to the user for further selection. The standard selections would include messages such as "NOT AVAILABLE", "ON VACATION", "IN TRANSIT FOR INDEFINITE PERIOD", or other massage that does not require and further user input except to select the standard message and exit the application. Further details regarding the standard message selection process are considered unnecessary and are not presented in any greater detail.

If the user wishes to provide further information regarding the user's unavailability for other IM users, the user is enabled to select one or more of the other blocks shown in FIG. 3 before logging-off the IM application. For example, the user may select block 311 to indicate that the user is "IN TRANSIT" 307 and the user is further enabled to provide a phone number or cell phone number in block 309 at which the user may be reached while in transit. Similarly, the user by selecting block 317 is enabled to indicate that the user is "ON VACATION" 313 and the user may input the applicable dates in block 315. Also, if the user wishes to create a custom message or provide a listing of users who would be authorized to access the user's messages 319, the user may so indicate by marking box 321. When the user has completed making his or her selections from the off-line status message screen 301, the user is enabled to select the "DONE" block 323 to continue. The user may also cancel at any time by selecting the "CANCEL" block 327. In the event blocks 311 or 317 are selected, the entered data is saved to an IM server database and made available to other IM users as appropriate. If the user selects block 321 to create a custom message, a "CREATE MESSAGE AND AUTHORIZED ACCESS SCREEN" 401 is displayed to the user in the present example for further user input.

Figure 4:
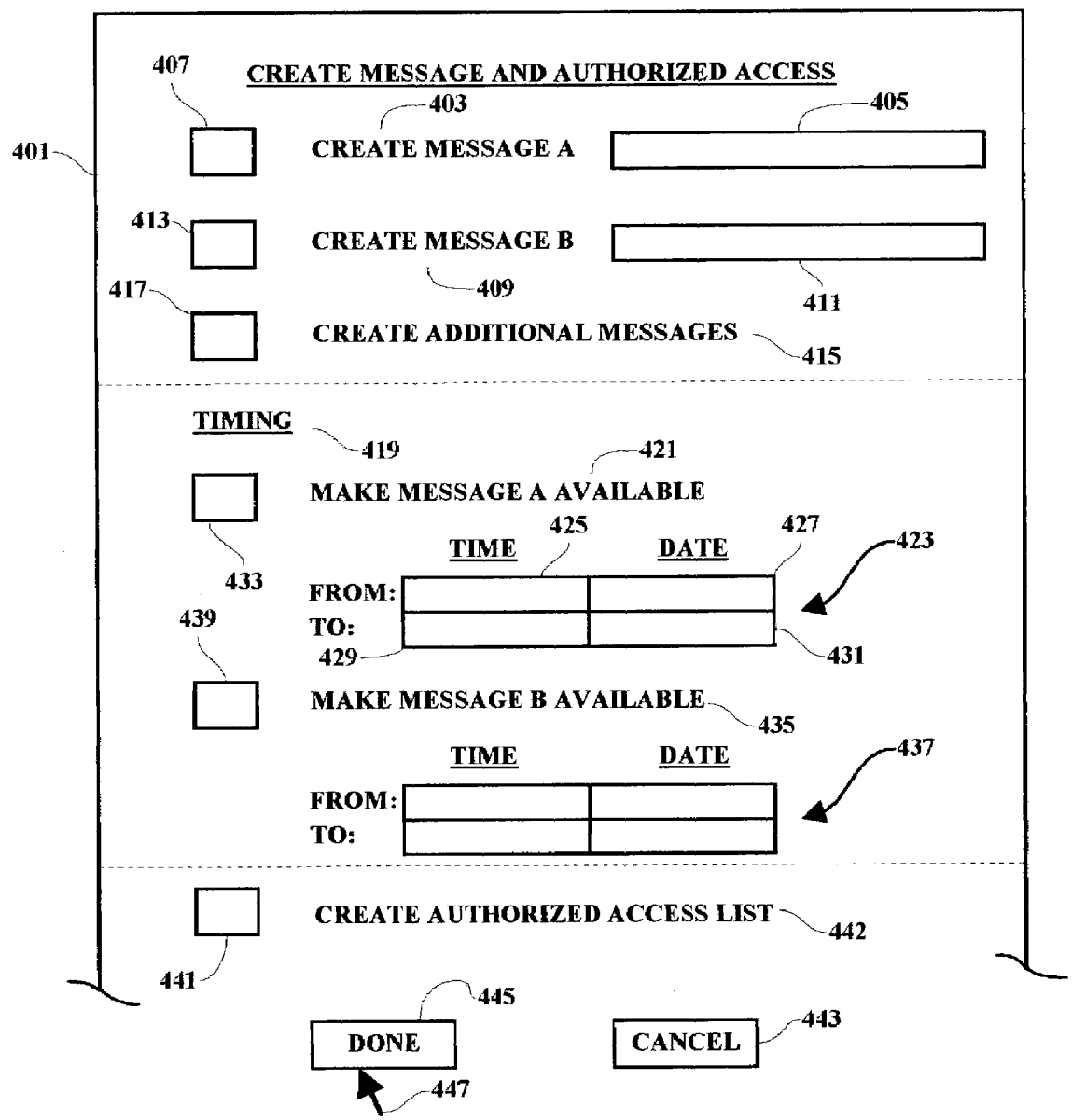
FIG. 4 is an illustration of a display screen which enables a user to select one of several optional operational enhancements in an exemplary embodiment of the present invention.

As shown in FIG. 4, the "Create Message" screen 401 enables a user to create one or more custom messages. The user may create a first custom message by marking block 407 to create message "A" 403 and entering the text of the custom message in the corresponding block 405. Similarly, the user may create a second custom message by marking block 413 to create message "B" 409 and entering the text of the second custom message in the corresponding block 411. Further custom messages 415 may also be created by checking block 417 which, in one example, would cause a pop-up window to appear (not shown) to enable further text input and custom messages from the user in a manner similar to that shown for messages A and B.

The CREATE MESSAGE screen 401 also enables the user to input the user's timing requirements 419 for the created messages such that certain ones of the messages will be accessible by other IM users only during the times specified by the user for the corresponding message. For example, in the present example, for message A 421, the user may fill in a data block 423 to indicate accessible times and dates for message A and checking the message A timing block 433. The user is enabled to input the exact times 425, 429 and dates 427, 431 that message A will be made available. Similarly, for message B 435, the user may fill in a data block 437 to indicate accessible times and dates for message B and checking the message B timing block 439.

The user may also cancel the operation at any time by checking the CANCEL block 433. If the user does not wish to create an Authorized Access List, the user may check the DONE block 445 with pointer 447 after inputting the user's timing requirements and the timing information as well as the custom messages will be stored at the IM server off-line message database for access by other IM users.

Figure 5:
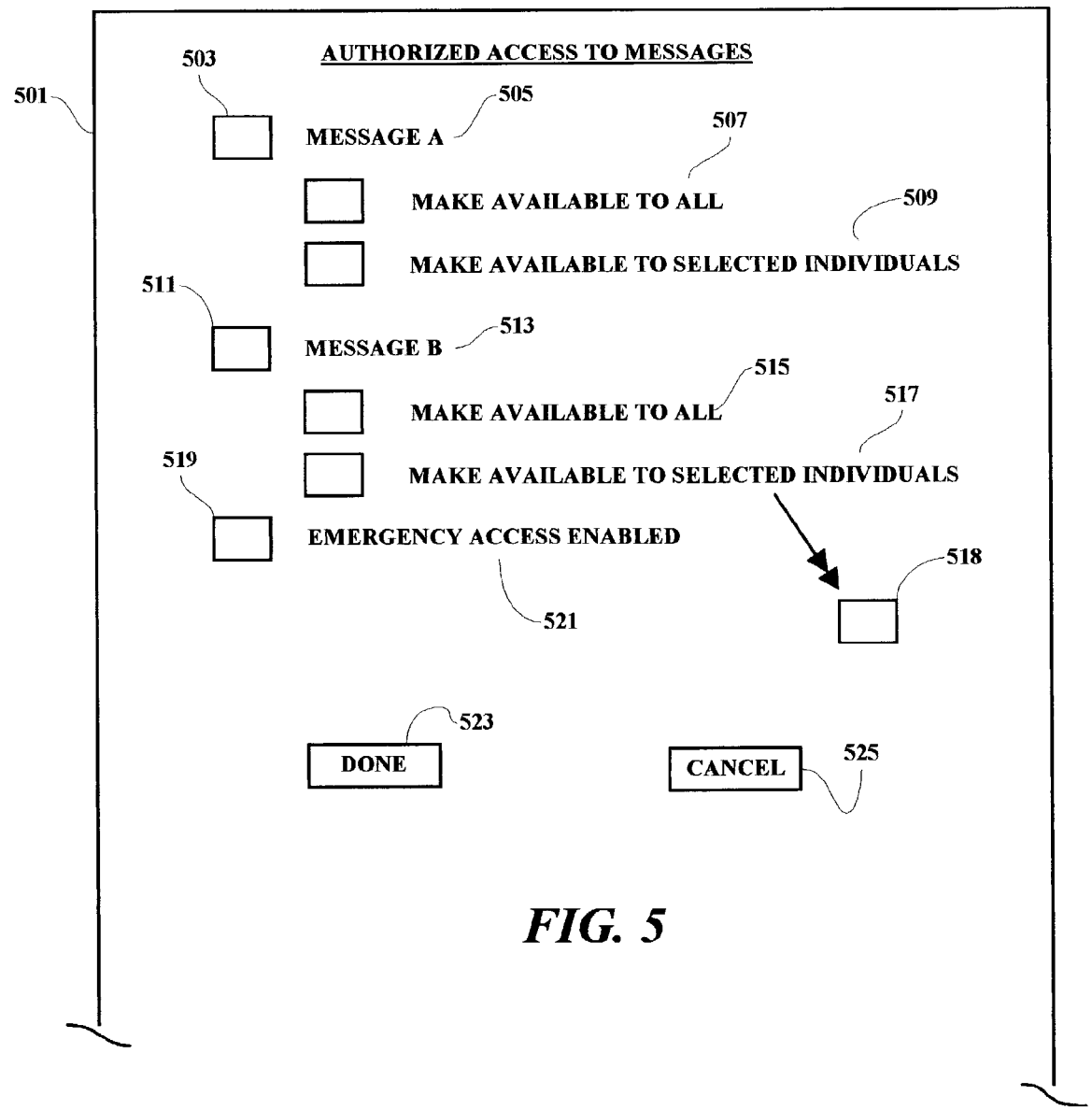
FIG. 5 is an illustration of a display screen which enables a user to select one or more features related to the disclosed exemplary system.

If the user wishes to Create an Authorized Access List 442, the user is enabled to select block 441 for further user input as shown in FIG. 5. When the user selects block 441 in the present example, to create an authorized access list to the created messages, an authorized access selection screen 501 is displayed to the user. As shown, the user is enabled to designate that only designated authorized users specified by the user may have access to corresponding messages. For example, if the user wishes to designate which individuals will have access to message A 505, the user is checks block 503 in FIG. 5. The user may then check the appropriate block to make message A available to all 507 on the users buddy list or to make message A available to only individuals selected by the user 509. Similarly, with regard to message B 511, the user may check the appropriate block to make message B available to all 515 on the users buddy list or to make message B available to only individuals selected by the user 517. If the user wants to give access to only a selected few with regard to either message, a pop-up window 518, containing a listing of individuals from which to choose, will be displayed to the user. Also, the user may select to authorize emergency access 521 by checking block 519. The emergency access protocol would be an agreed-upon predetermined process by which an individual who would need to contact the user would be directed to obtain access to an IM server administrator, for example, to determine an emergency phone number for the user. The user may cancel at any time by checking block 525 or indicate that the user has finished making selections by checking the DONE block 523.

Figure 6:
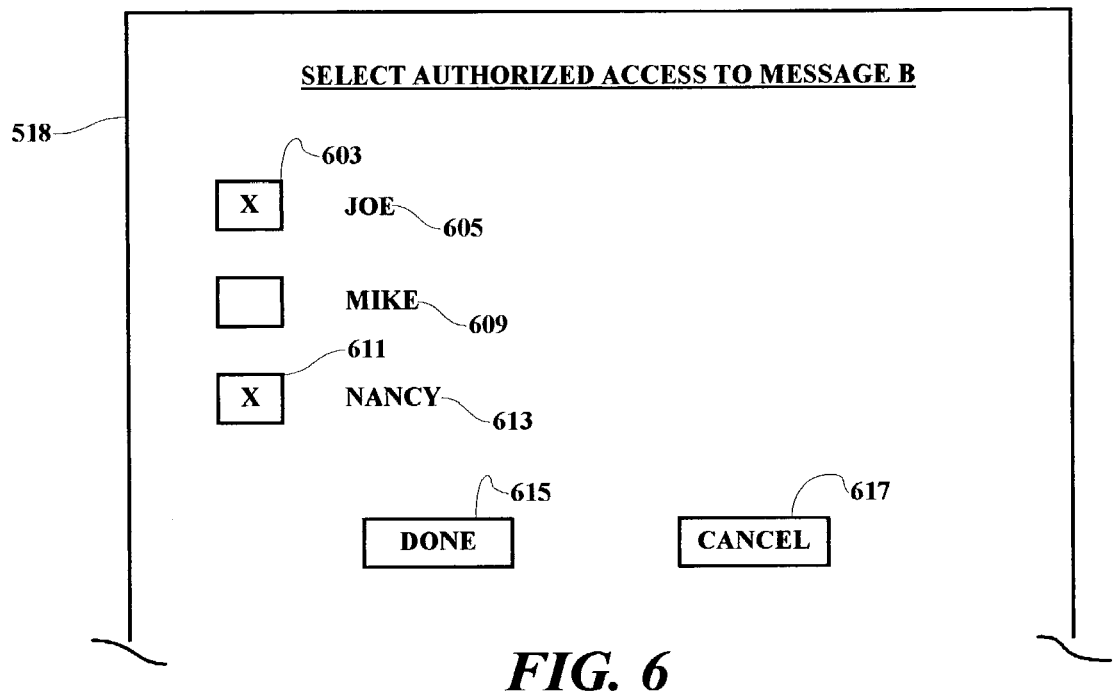
FIG. 6 is an illustration of a display screen which enables a user to select one or more additional features related to the disclosed exemplary system.

If the user has chosen to designate only selected individuals to have access to either message, a Select Authorized Access pop-up screen 518 will be displayed to the user to enable the user to select which individuals will have access to which messages. In the present example, the user has chosen to designate selected individuals to have access to message B. The screen 518 in the present example will include the names of individuals on the user's buddy list and the user is enable to choose which of those individuals will have access to the user's created off-line status message B. In the example, since no selection was made for message A, message A will be available for all those on the users buddy list by default. As shown in FIG. 6, the user has designated only Joe 605 by checking block 603 and Nancy 611 by checking block 613 to have access to the user's off-line status message B. Thus Mike 609 will not have access to message B will may be shown a default off-line status message instead depending upon specific system design. The user may check CANCEL 617 at any time or check the DONE block 615 to indicate that the user is finished making selections from the screen 518.

Figure 7:
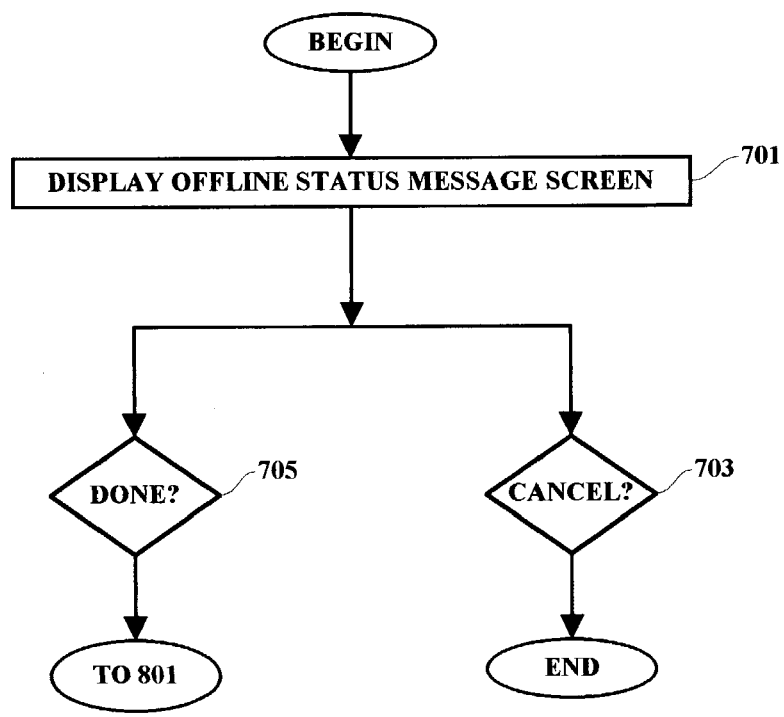
FIG. 7 is an initial flow chart useful in explaining the operation of an exemplary embodiment of the disclosed system.

As shown in FIG. 7, the selection processing begins with the display 701 of the off-line status message screen 301. The processing ends if the user selects 703 the CANCEL block 327 but continues to block 801 if the user selects 705 the DONE block 323. When the DONE block 323 is selected, the system checks to determine which selections the user has made and proceeds to implement the user's selections.

Figure 8:
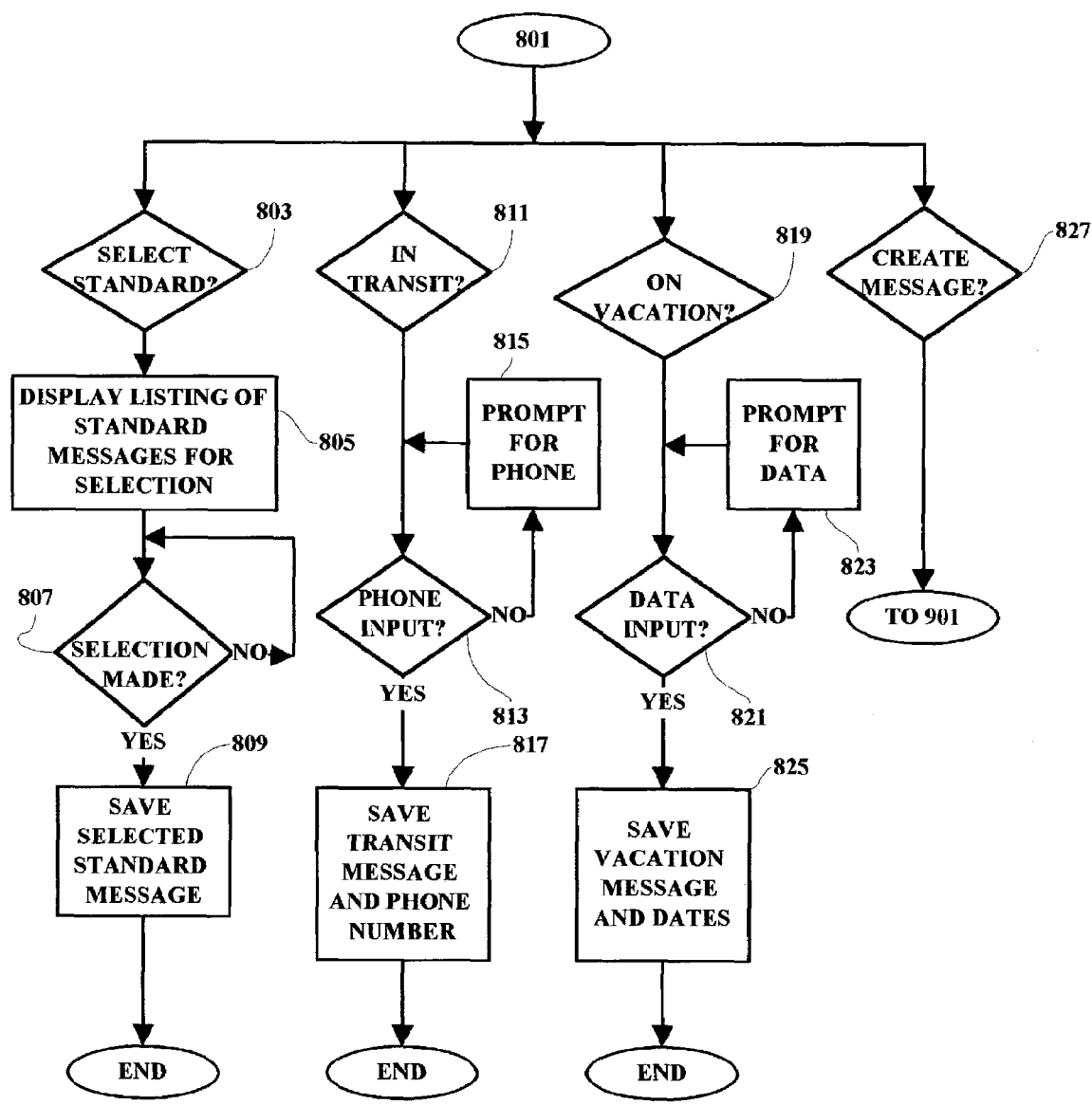
FIG. 8 is a flow chart illustration of an exemplary implementation of the disclosed system and related methodology.

As shown in FIG. 8, if the user has selected to use a standard off-line status message 803, a listing of standard messages is displayed 805 and the user is enabled to select which standard message the user wishes to be accessible to individuals on the user's buddy list. Once the selection is made 807, the selection is saved at the IM server database 809 and displayed to other users when other users on the user's buddy list log-on to the IM application.

If the user has selected 811 an "In Transit" message 307 from FIG. 3, then after selecting DONE 323, the phone input block is checked for phone number data 813 and if no phone number has been inserted into the phone number block 309 then the user is prompted to insert the phone number where the user can be reached while in transit. Once the phone number has been input, the message along with the phone number is saved at the IM server database 817 and the process is ended.

If the user had selected 819 the "Vacation" message 313, then the vacation data block 315 is checked 821 for vacation data, and if no vacation data has been inserted into the vacation data block 315 then the user is prompted 823 to insert the vacation data, i.e. the dates and times as applicable. Once the vacation data has been input, the Vacation message along with the corresponding data are saved at the IM server database 821 and the process is ended.

Figure 9:
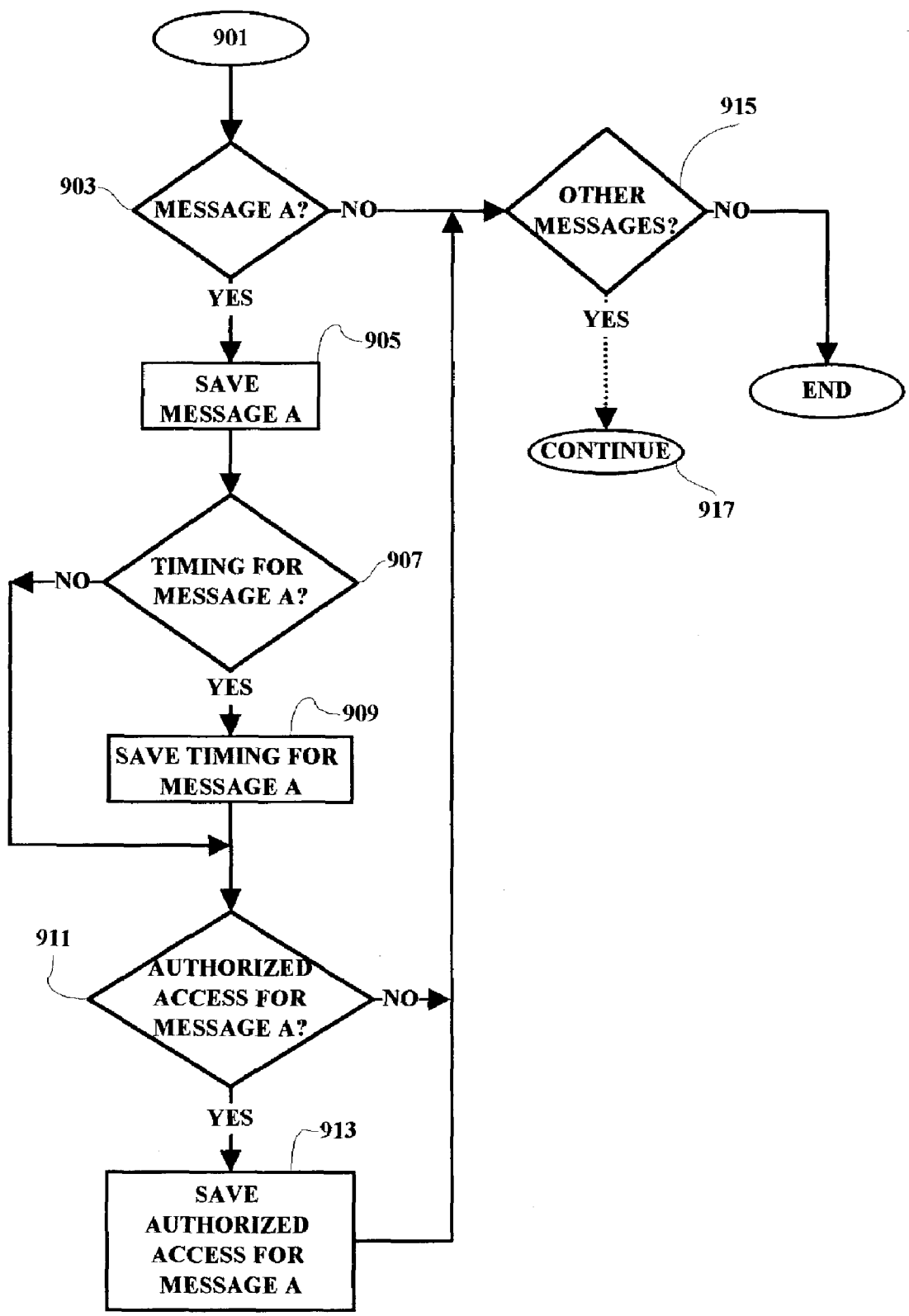
FIG. 9 is a flow chart illustration of an overall operation of an exemplary implementation of the disclosed system and methodology.

If the user had selected to create a message 827 (319 in Figure), then, after selecting DONE 323, the processing continues to block 901 as shown in FIG. 9. The application will then check 903 for user input in the message A field 405. If the user had created 903 a first message or Message A in the example, the message is saved 905 to the IM server database, and a check is made to determine if the user had input any timing requirements 907 for message A. If such timing requirements were input by the user, the timing data are saved 909 to the IM server database and a check is made to determine if the user input any authorized access requirements 911 for message A. If the user had identified buddies who would have authorized access 911, then those identified by the user to have authorized access to off-line status message A would be saved to the IM server database 913. Next, a check is made to determine if there are any additional messages 915. This data gathering process would be repeated 917 for other messages until all data associated with all created off-line messages had been saved to the IM server database. The user-input messages, timing and authorized user data would then be made available to other users who log-on to the IM server in accordance with the user's input.

Figure 10:
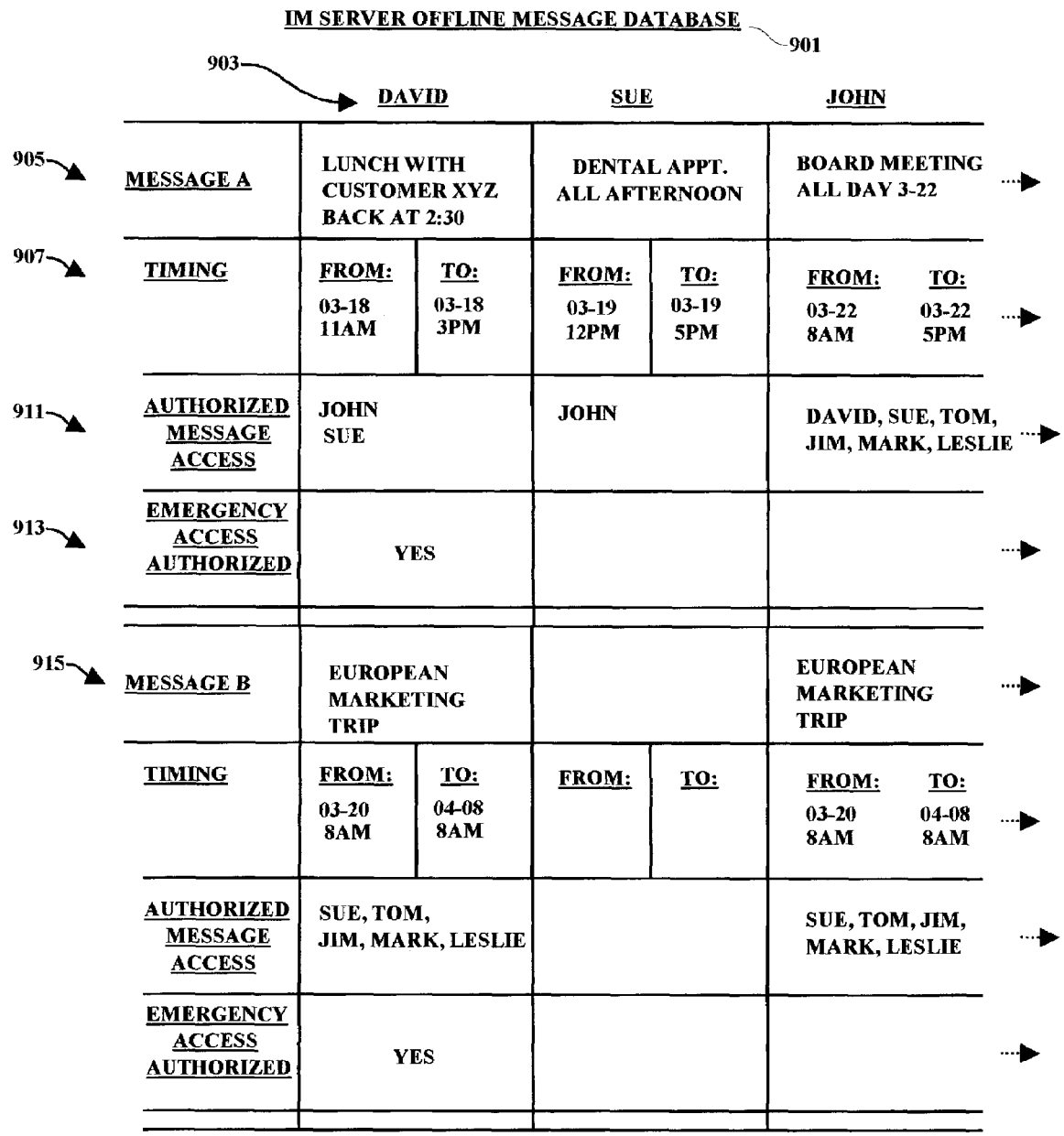
FIG. 10 is a schematic diagram illustrating an exemplary IM server database which may be implemented in relation to the present invention.

FIG. 10 illustrates a portion of an exemplary database 901 which may be maintained at the IM server to keep track of user input by all users who may log-on to the server-based IM application. As shown, user data are stored in columns corresponding to the individual users, e.g. David, Sue and John 903. Data rows keep track of similar data for each user. For example, a first row 905 contains message A inputs from each user David, Sue and John. Similarly, the next row 907 tracks timing for message A for each user, and the next rows 911 and 913 keep track of authorized access and emergency access for message A of each user. Similar data are stored for message B 915 of each user and also for additional messages. As the stored data expire by timing requirements or are replaced by the respective user, the database is updated to maintain current information.

Figure 11:
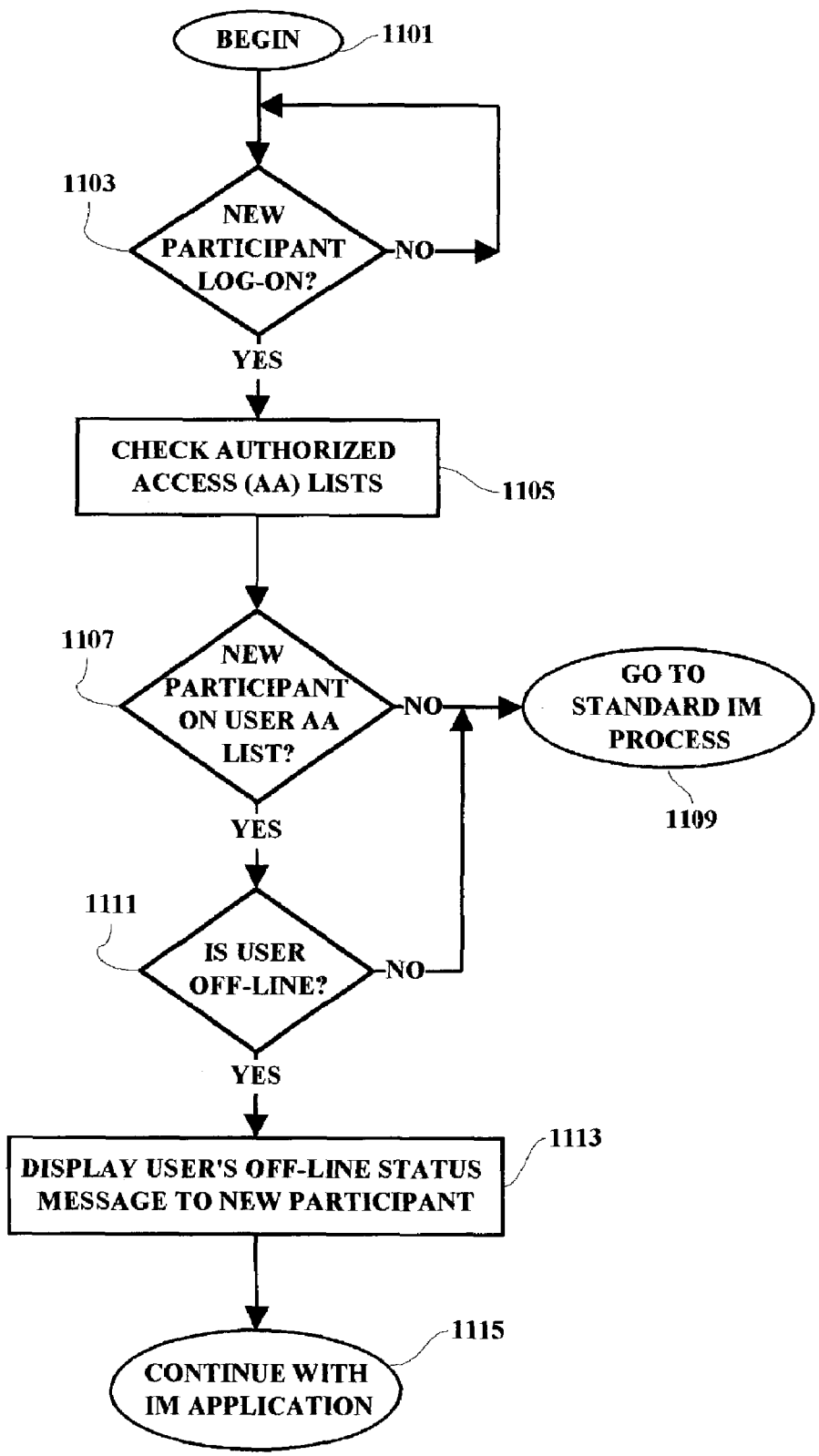
FIG. 11 is a flow chart illustration showing an exemplary sequence of events when a participant logs-on to an IM application.

In FIG. 11, a log-on sequence begins 1101 by detecting when a new participant logs-on 1103 to the exemplary IM application. The authorized access (AA) lists in the server database are then checked 1105 to see if the new participant is included in a user's AA list. If the newly logged-on participant is not in one of the user's AA lists 1107, then the standard IM processing is executed 1109. If, however, the new participant is on the user's AA list 1107, then a check is made to determine if the user is currently off-line 1111. Steps 1107 and 1111 can occur in any order. If the user is currently on-line 1111 then the flow returns to the standard IM processing 1109. If, however, the user is currently off-line 1111, then the user's off-line status message is caused to be displayed to the new participant 1113 and the process then continues with the IM application flow 1115.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in a portable or fixed memory device, such as so-called "Flash" memory, from which it may be loaded into other memory devices and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for enabling user control of user's off-line status messages available for display to other participants in a messaging application when said user is logged-off from said messaging application, said method comprising:
    enabling user timing input to establish times during which said user's off-line status messages are available for display to said other participants;
    saving said timing input for subsequent access in association with a communication of said user off-line status messages;
    enabling said user to input different selected times for each of a plurality of said user's off-line status messages;
    displaying an off-line message selection menu to said user, said off-line message selection menu containing a plurality of user off-line status messages of selectable content;
    enabling said user to select at least one of said user off-line status messages, and
    associating said user selected off-line status message with a corresponding user timing input.

2. The method as set forth in claim 1 and further including saving said user timing input at a messaging server, said messaging server being arranged for connecting said user to said other participants.

3. The method as set forth in claim 1 wherein one of said selectable content messages comprises a plurality of selectable fixed content messages, said user being enabled to select from said plurality of fixed content messages.

4. The method as set forth in claim 1 wherein one of said selectable content messages comprises a plurality of user input message types, said user input message types including means for enabling user input of text content to said user input message types.

5. A storage medium including machine readable coded indicia, said storage medium being selectively coupled to a reading device, said reading device being selectively coupled to processing circuitry within a computer system, said reading device being selectively operable to read said machine readable coded indicia and provide program signals representative thereof, said program signals being effective for enabling user control of user's off-line status messages available for display to other participants in a messaging application when said user is logged-off from said messaging application, said program signals being further effective for;
    enabling user timing input to establish times during which said user's off-line status messages are available for display to said other participants;
    saving said timing input for subsequent access in association with a communication of said user off-line status messages;
    enabling said user to input different selected times for each of a plurality of said user's off-line status messages;
    displaying an off-line message selection menu to said user, said off-line message selection menu containing a plurality of user off-line status messages of selectable content;
    enabling said user to select at least one of said user off-line status messages; and
    associating said user selected off-line status message with a corresponding user timing input.

6. The medium as set forth in claim 5 wherein said program signals are further effective for:
    saving said user timing input at a messaging server, said messaging server being arranged for connecting said user to said other participants.

7. The medium as set forth in claim 5 wherein one of said selectable content messages comprises a plurality of selectable fixed content messages, said user being enabled to select from said plurality of fixed content messages.

8. The medium as set forth in claim 5 wherein one of said selectable content messages comprises a plurality of user input message types, said user input message types including means for enabling user input of text content to said user input message types.

9. A system for enabling user control of user's off-line status messages available for display to other participants in a messaging application when said user is logged-off from said messaging application, said system comprising:
    a messaging server;
    a plurality of terminals, said terminals and said messaging server being coupled together through an interconnection network, each of said terminals including a display device and a user input device, each of said terminals being selectively operable for enabling user timing input to establish times during which said user's off-line status messages are available for display to said other participants, said system being further selectively operable for saving said timing input for subsequent access in association with a communication of said user off-line status messages, said system further including means for enabling said user to input different selected times for each of a plurality of said user's off-line status messages, said system being further operable for dis playing an off-line message selection menu to said user on a display device, said off-line message selection menu containing a plurality of user off-line status messages of selectable content, said system being further operable for enabling said user to select at least one of said user off-line status messages; and associating said user selected off-line status message with a corresponding user timing input.

10. The system as set forth in claim 9 wherein said system further includes means for saving said user timing input at said messaging server.

11. The system as set forth in claim 9 wherein one of said selectable content messages comprises a plurality of selectable fixed content messages, said user being enabled to select from said plurality of fixed content messages.

12. The system as set forth in claim 9 wherein one of said selectable content messages comprises a plurality of user input message types, said user input message types including means for enabling user input of text content to said user input message types.

* * * * *